United States Patent Office 3,671,358
Patented June 20, 1972

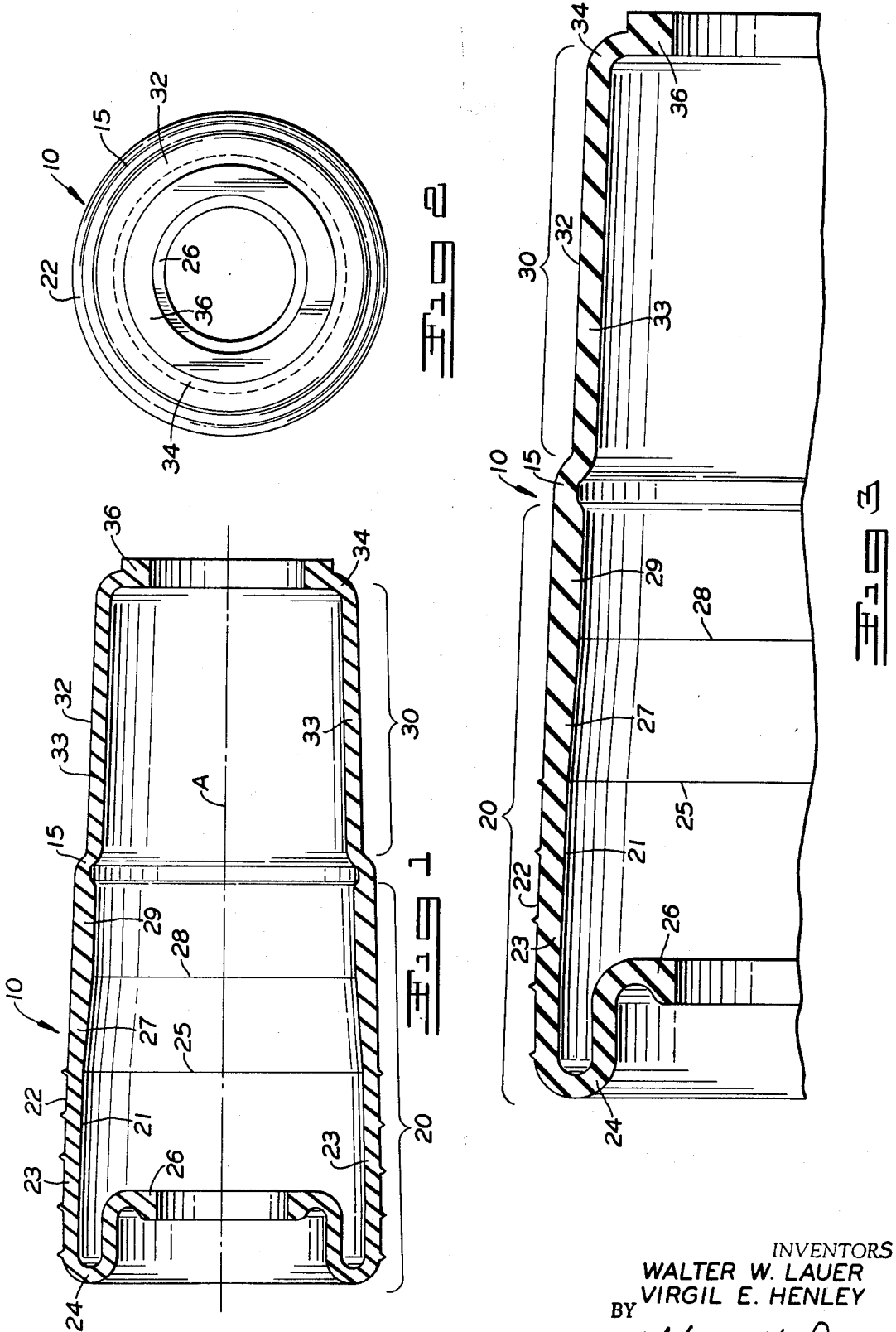

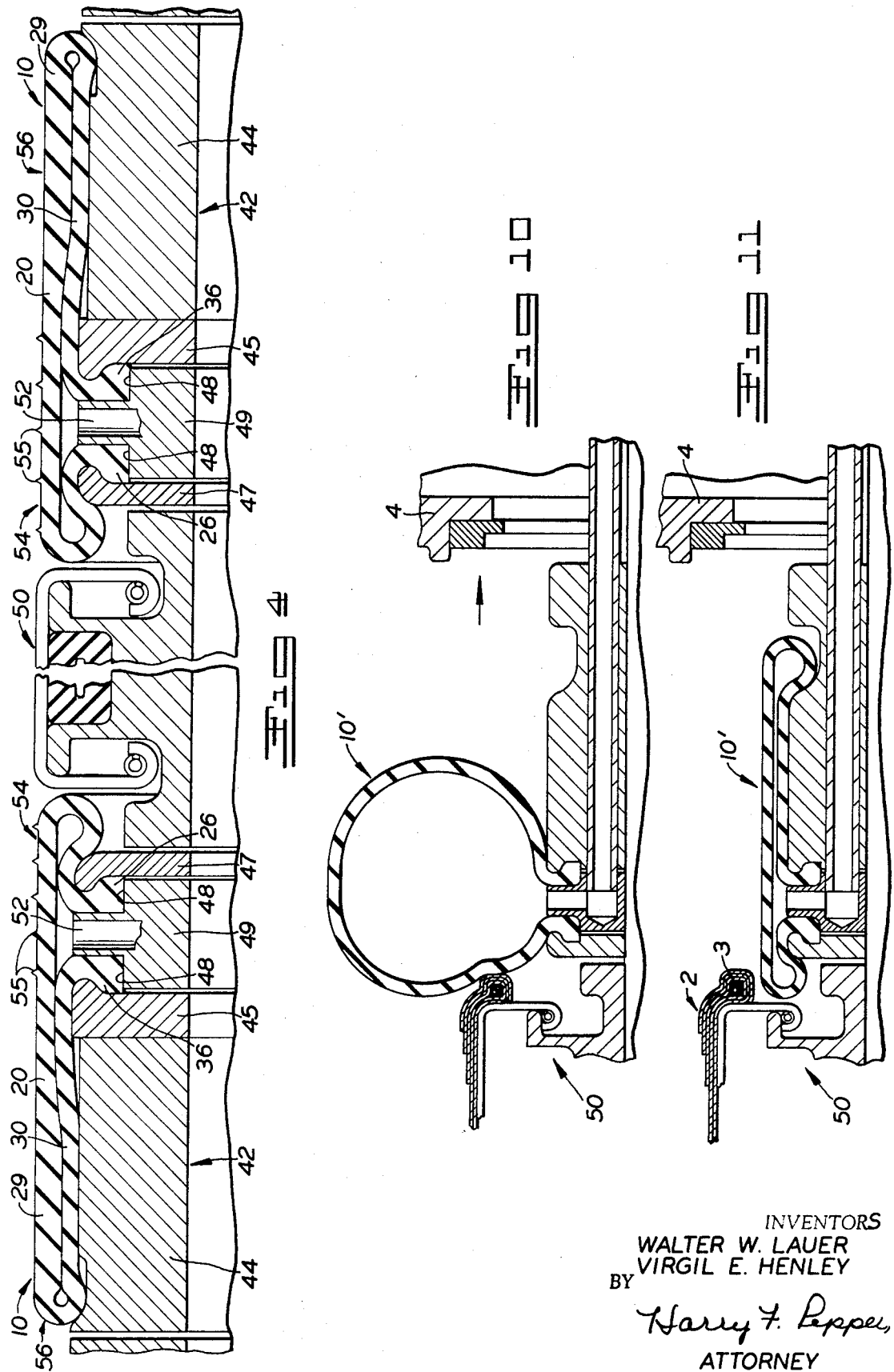

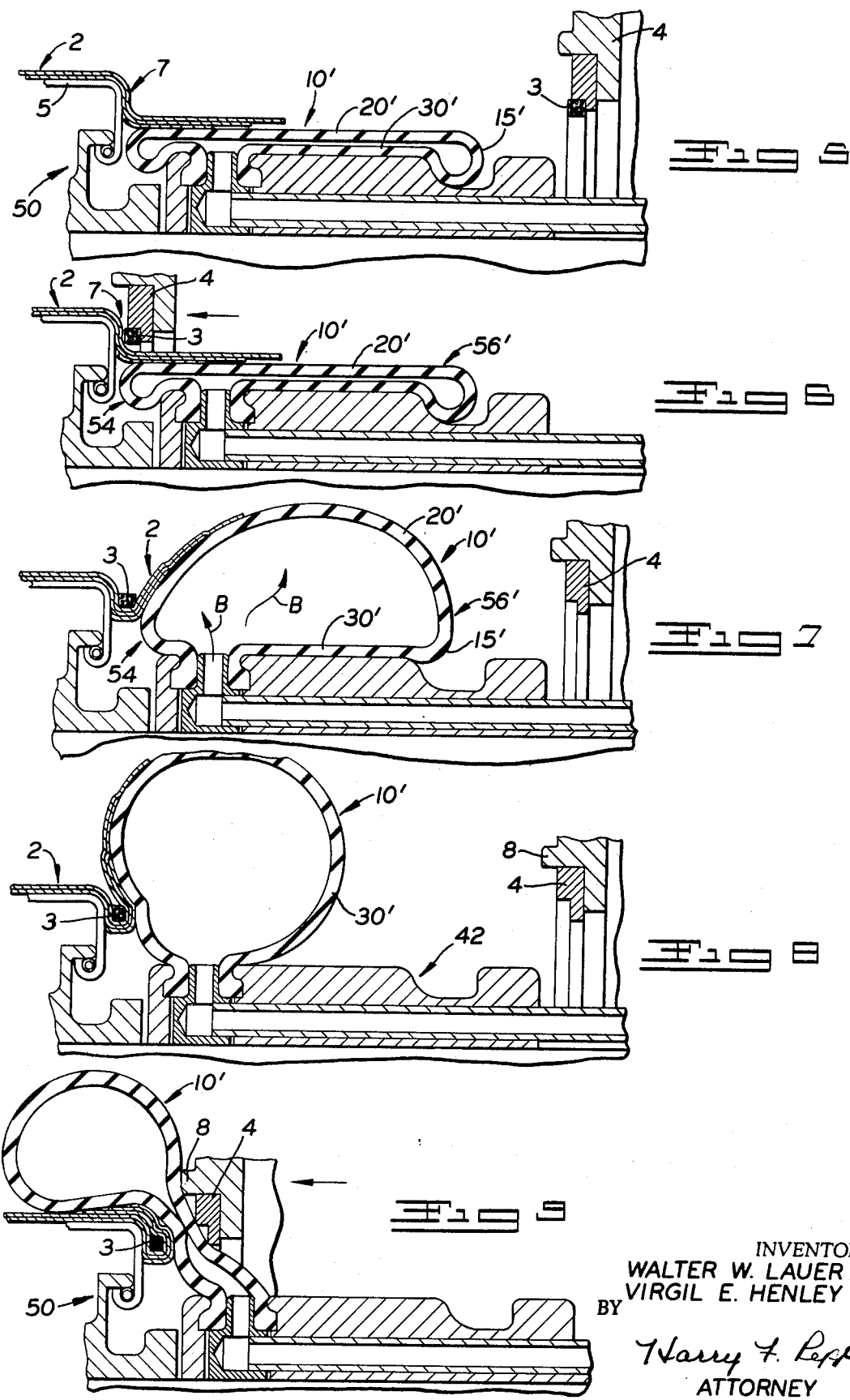

3,671,358
INFLATABLE PLY TURNUP BLADDER FOR A
TIRE BUILDING MACHINE
Virgil E. Henley, Akron, and Walter W. Lauer, Canton, Ohio, assignors to The General Tire & Rubber Company
Filed Apr. 2, 1970, Ser. No. 25,182
Int. Cl. B29h 17/22
U.S. Cl. 156—401                                    7 Claims

ABSTRACT OF THE DISCLOSURE

A ply turnup bladder for a tire building machine consists of a folded, specially dimensioned, all rubber sleeve which has been molded about a longitudinal axis of symmetry. The sleeve as molded has a uniform cross-section along any one plane normal to its axis and comprises an axially extending outer bladder wall portion of major outside diameter and an axially extending inner wall portion of minor outside diameter, which portions are integrally joined by an annular or circular "fold point." The terminal portions of the sleeve are substantially thickened rings or flanges used to mount the sleeve on a rigid, annular bladder support. The cross-section of the outer bladder wall portion of the sleeve preferably varies in thickness in the axial direction attaining maximum thickness near the fold point of the sleeve. Turnup bladders of this type are structurally simpler, less expensive, and longer lasting than many bladders presently in use.

BACKGROUND OF THE INVENTION

The invention relates to tire building machines employing ply turning mechanisms operatively associated with a tire building drum and more particularly to such mechanisms which incorporate inflatable bladders to turn the edges of the plies at the drum shoulders over onto the surface of a building drum to encase inextensible bead rings previously positioned at the shoulders.

Many tire building machines presently in use include mechanized ply turn ups incorporating annular, inflatable, ply turn up bladders. Such a blader is usually positioned at each end of a rotatable, radially expansible building drum. The diameter of the unexpanded drum and that of the uninflated bladders are usually substantially equal and the annular margins of carcass plies placed around the building drum extend beyond the ends of the drum onto the surface of each turn up blader. After the carcass is built the building drum expands providing shoulders for placement of inextensible bead rings against the respective annular portions of the carcass plies at the drum shoulders. After positioning of the bead rings, the turn up bladders inflate and carry the edges of the plies supported thereby up and around each of the bead ring assemblies. Usually some means is provided for engaging the rear of each inflated bladder to push the bladder with ply edges or ends over onto the drum surface thereby completing encasement of the beads within the proper carcass portions of the tire. For a more complete description of a typical machine using bladder type turn ups, reference is made to U.S. Pat. No. 3,171,769 assigned to the present assignee.

As evident from the disclosure of the aforementioned patent, the shape and construction of the turn up bladder or bag are important factors influencing its expansion characteristics. Most bladders or bags used for this purpose are made of cord reinforced elastomeric material. More particularly, the bladders usually comprise an inner liner of air impervious elastomer and an outer surface layer of another elastomer which sandwich rubberized plies of reinforcing cords. Preferably at least two such cord fabric plies are used with the cords biased at a small angle relative to the axis of the bag. Moreover, the cords of one fabric ply extend at equal but opposite angles relative to the cords in an adjacent ply. These bladders are usually built by "plying up" the various layers and curing the composite article under compression to its final shape or contour.

The shape of a typical turn up bladder includes an annular outer wall portion the axial ends of which are turned axially inwardly to form a pair of inner wall portions. The inner wall portions terminate in annular mounting flanges which contain inextensible bead rings, somewhat similar to tire beads. These beaded flanges secure the bag to a rigid annular support which rotates with the tire building drum. The two beaded flange portions are side by side and off-set with respect to the middle of the bag adjacent the "inboard" portion of the bag, which is that portion of the bag nearest the end of the building drum. A more comprehensive discussion of the cured shape of a typical turn up bladder is also contained in the aforementioned U.S. Pat. No. 3,171,769.

While this general type of bladder has been fairly satisfactory in performance, some problems exist in connection therewith. These problems may be attributed either directly or indirectly to the construction of the bladder and to the way in which it is made.

Because of the multi-layer construction, which necessitates plying up and/or calendering, and because of the presence of plies of rubberized cord fabric, the bag is spliced at several locations. A spliced joint is always a cause for concern in any manufactured article and particularly in an elastomeric member which is to undergo repeated substantial flexing. Also, splices can become contaminated which may cause a premature separation of a portion of the bladder thereby rendering it useless.

A bladder of the type decribed usually requires two or more different rubber stocks which makes cost a factor for consideration. Also, compatibility of the different stocks must be considered so as to assure that molding of the laminate results in the proper commingling for structural unity.

The dimensions of a turn up bladder are dependent upon the size of the building drum with which it is to be associated. Because the bladders are vulcanized to assume the uninflated form in which they are to be used, i.e. folded to comprise the external and internal wall portions mentioned previously, the vulcanization and shaping is usually done in compression or internal pressure type molds. It is known that close dimensional tolerances are more difficult to achieve in this type of operation than in other types of shaping or molding operations, such as for example, injection molding. Even though dimensional uniformity is not ideal in the bladders of the type described in U.S. Pat. No. 3,171,769, non-uniformity has not presented great problems in the larger size bladders. However, dimensional uniformity becomes significant when fabricating such bladders for use with smaller drums (i.e. drums approximately 10 inches or less in diameter). Dimensional non-uniformity has been found to have an adverse effect upon the expansion characteristics of smaller bladders. Thus, turn up of plies using the type of bladder described has not found widespread use in conjunction with the small building drums, for example, those used in building industrial tires (e.g., tires for small trailers, fork-lift trucks, wheelbarrows, etc.).

Perhaps the most serious problems with the bladders described stem from structural failure of the cord fabric plies used therein. The periodic stresses and strains caused by inflation and deflation of a typical bladder can cause individual cord fatigue and breakage leading to an overall bladder failure. Also, repetitive inflation and deflation causes a "sawing" action between the crossed cords of adjacent plies. This action is more acute during inflation of smaller bladders. This is because the "percentage of stretch" required of smaller bladders is usually much greater than that of the larger bladders. By "percentage of stretch" is meant the difference between the maximum diameter attained by the bladder when inflated and its uninflated diameter expressed as a percentage of its uninflated diameter. For example, a turn up for a 4 inch drum, which uninflated is approximately 4 inches in diameter, expands to around 9 inches in diameter during ply turn up—a stretch of approximately 125%. A bladder of approximately 15 inches in diameter expands to a maximum of about 25 inches—a stretch of approximately 67%. Thus, cord reinforced bladders are notably inadequate in smaller sizes.

SUMMARY OF THE INVENTION

It is an object of the present invention to provide a turn up bladder for a tire building machine of improved construction which is capable of being designed for use with a wider range of tire drum sizes than heretofore.

It is another object of the present invention to provide a turn up bladder for a tire building machine having no spliced joints, no cords, no special bead structures and which is composed of a single elastomeric vulcanizate.

It is still another object to provide an all rubber turn up bladder having structural characteristics which allow it to be designed for practical use with small industrial type tire building drums.

It is another object to provide a turn up bladder for a tire building drum which is structurally simple, inexpensive to manufacture, and possesses flex life equal to or better than many of the turn up bladders presently in use.

Briefly these and other objects, which will become more clearly evident hereinafter, are achieved by providing an all rubber turn up bladder formed by folding an intricately contoured, molded sleeve. The sleeve consists of an elastomeric compound specially selected for certain desired properties which is molded, preferably by injection molding, about a longitudinal axis of symmetry. The sleeve has a substantially uniform cross-sectional thickness along any one plane normal to this axis of symmetry. The terminal portions of the sleeve are inwardly turned flange like rings of thickened cross-section. The axial extent of the sleeve is characterized by an annular outer bladder wall portion of major diameter reducing through an annular fold portion to an inner wall portion of minor diameter. An inflatable turn up bladder is formed simply by forcing the inner bladder wall portion to fold inside the outer bladder wall portion along the annular fold portion.

BRIEF DESCRIPTION OF THE DRAWINGS

In the drawings, a preferred embodiment of the invention is shown wherein:

FIG. 1 shows a section along the axis of the molded sleeve adapted for folding to form the turn up bladder according to the present invention;

FIG. 2 shows an end view of the sleeve shown in FIG. 1;

FIG. 3 is an enlarged partial section also taken along the axis of the sleeve shown in FIG. 1, showing in more detail some of the key contours of the sleeve.

FIG. 4 is a fragmented longitudinal section of a tire building drum with turn up mechanisms comprising bladders formed from sleeves similar to the sleeve shown in FIG. 1; and, FIGS. 5 through 11 are a sequence of views showing a typical turn up operation at one end of a building drum employing a bladder constructed according to the present invention.

DETAILED DESCRIPTION

The invention according to a preferred embodiment is herein described with reference to the several views of the drawings in which like numerals refer to like parts. Initially this description concerns the details of a sleeve as illustrated in FIGS. 1 through 3 which according to the principles of the invention is easily folded to form an improved ply turn up bladder for a tire building machine.

The sleeve, generally indicated as 10, extends along an axis A with all portions of the sleeve being annularly symmetrical in respect thereof. The axial extent of the sleeve 10, as indicated in FIGS. 1 and 3, is characterized by an axially extending annular portion 20 of "major outside diameter" and an axially extending annular portion 30 of "minor outside diameter." As seen in FIGS. 1 through 3, the outer surfaces 22 and 32 of portions 20 and 30, respectively, are tapered slightly throughout the axial lengths thereof. Therefore, the outside diameters of the respective portions 20 and 30 are variable. Describing the portion 20 as being of "major outside diameter" and the portion 30 as being of "minor outside diameter" means that all the outside diameters of the annular portion 20 are greater than any one of all of the outside diameters of annular portion 30. The tapering of surfaces 22 and 32 is a preferred feature for reasons to be described later in this description. However, the respective outside diameters may be constant, if desired, without departing from the scope of the present invention.

The portion 20 of major outside diameter will be hereinafter referred to as the "outer bladder wall portion" of the sleeve 10, while the portion 30 of minor outside diameter will be referred to as an "inner bladder wall portion." These terms reflect the function of the portions 20 and 30 after sleeve 10 is folded to form a turn up bladder according to the present invention.

The sleeve 10 is molded in the form shown in FIG. 1 and includes an axially inwardly turn 24 at the forward end of outer bladder wall portion 20 which terminates in a circular flange-like ring 26 which is also symmetrically disposed about the axis A. The rearward end of portion 30 is provided with a similar axial inward turn 34 terminating as a flange-like ring 36, also symmetrical relative to axis A. The rearward end of outer bladder wall portion 20 is integrally connected to the forward end of inner bladder wall portion 30 through an annular fold portion or juncture 15.

The comparative relationships of the cross-sectional thicknesses of the several portions of the sleeve are significant. For example, the terminal flange-like rings 26 and 36 are molded to a greater cross-sectional thickness than that of any of the remaining portions of the sleeve. The cross-sectional thickness of turns 24 and 34, the inner bladder wall portion 30 and the forward wall section 23 of outer bladder wall portion 20 are approximately equal, and preferably represent the minimum cross-section of the sleeve.

As seen in FIG. 1, and particularly in FIG. 3, the outer bladder wall portion 20 includes three wall sections 23, 27 and 29, distinguishable by the degree of taper of inner surface 21 of portion 20. Wall section 23 is of constant cross-section until reaching point 25 where the inner surface 21 begins a taper of increased angle. Thus, wall section 27 is of a variable cross-section. This increased taper continues thereby increasing the cross-section of portion 20 to an annular point 28 at which the cross-sectional thickness of portion 20 attains a maximum value. Wall section 29 is of a constant cross-section continuing toward fold portion 15 where the cross-section reduces to that of inner bladder wall portion 30. The thickness of the wall 33 of inner bladder wall portion 30 remains constant in an axial direction until reaching flange-like ring 36. The wall 29 of portion 20 is greater in cross-sectional thickness than the wall 23 in order to achieve certain desired expansion characteristics, which will be explained hereinafter. An abrupt change in thickness from that of wall 23 to wall 29 is undesirable, thereby necessitating the wall 27 of variable cross-section.

The sleeve 10 is preferably molded such that the cross-sectional thickness along any one plane perpendicular to axis A is uniform. This characteristic of sleeve 10 is important in order to achieve the advantages desired. Because of this precise requirement the sleeve 10 should be molded to the form shown in FIG. 1 by an operation capable of the intricate dimensional control necessary. Such intricate shaping is possible by injection molding, which is the preferred manner of forming the sleeve 10. This is the basic reason why the outer surface of the sleeve 10 (i.e. surfaces 22 and 32) are tapered. This slight taper is preferred to facilitate removal of the sleeve 10 from an injection type mold without requiring a structural separation of the mold.

The sleeve 10 consists wholly of a selected elastomeric vulcanizate. In other words, the sleeve 10 is "all rubber" because it contains no reinforcing cords or other strengthening structures such as bead type rings usually provided in mounting flanges 26 and 36. Since the sleeve 10 is to form a ply turn up bladder for a tire building machine, the vulcanizate comprising the sleeve is carefully selected with this in mind.

Because of the repetitive inflation and deflation, a turn up bladder must possess the somewhat esoteric quality of "high flex life." The flex life of a given vulcanizate can be considered "high" for one particular use and "low" for another. Flex life may be generally expressed in term of "cycles." A vulcanizate which repeatedly undergoes a particular type of flex a given number of times before failure is said to have a flex life of that number of cycles. The flex cycle for a typical turn up bladder includes an expansion, turn over and deflation for each tire built. Thus, the flex life of a turn up bladder may be expressed in either cycles or in the number of tires which are built using the bladder. Generally, the intricately molded sleeve as hereinbefore described can be made with an exceptionally high flex life, compared to a typical cord reinforced bladder, by careful choices of elastomers. It is difficult to relate any one of the traditional physical properties of vulcanizates to flex life. However, in the case of turn up bladders according to this invention, it is found that a vulcanizate possessing a combination of certain minimum properties is likely to have a satisfactory flex life. These minimum properties are (at optimum cure):

Stress at 300% elongation (300% modulus)
lbs./in.² __ 1300
Tensile strength _____ lbs./in.² __ 1800
Elongation _____ percent __ 350

Any vulcanizate possessing one or more of the above properties at a value substantially less than that indicated, would probably have an unacceptable flex life for purposes of the invention.

A more subjective criterion is available for selection of a high flex life vulcanizate. Rubbers which have the property of "crystallization" on extension are usually found to give a long or high flex life. Typical examples of such rubbers are neoprene, natural and polyurethane rubbers.

Another property important in determining the selection of a suitable bladder vulcanizate is its compression set or permanent set. In addition to a high flex life, the selected vulcanizate should have a low compression set. This requirement assures that the bladder will not "grow" after a certain number of cycles.

Compressing a vulcanizate changes its original dimensions. Upon removal of the compressive force, the vulcanizate tends to return to its original dimensions. The amount of return to its original dimensions expressed as a percentage of the change in dimensions caused by the compression is termed the "compression set" of the vulcanizate. There are several known standard test procedures for evaluating compression sets of vulcanizates. One widely used test for compression set is ASTM Test No. 395–67. In "Method B" of this test, a sample is compressed for seven days at a temperature of 158° F. A vulcanizate with a compression set value of 50% or greater under this test and method is considered low for purposes of the present invention.

In accordance with the foregoing, examples of typical rubbers and rubber blends which have been found suitable for molding into an all rubber turn up bladder are neoprene and blends of predominantly neoprene, natural rubber and blends of predominantly natural rubber, and some specially compounded polyurethane rubbers. Specifically, a compound of 85 phr. neoprene and 15 phr. SBR, where "phr." represents parts per hundred parts of rubber, by weight, has proven exceptional. Also, an all natural rubber bladder has been highly successful. Practical use of polyurethane is somewhat prohibited by cost.

As seen in FIGS. 1 through 3 the molded contour of the sleeve 10 is structurally conducive to being folded along juncture 15 so that inner bladder wall portion 30 is within and extends along the inner surface 21 of outer bladder wall portion 20. When so folded, flanges 36 and 26 will be disposed coaxially, side by side.

Referring to FIG. 4 two sleeves 10 are shown folded in this manner to form a pair of turn up bladders mounted on rigid annular supports 42 at each end of tire building drum generally represented as 50. The particular details of the building drum are not important to the instant invention and therefore most of these have been omitted.

In FIG. 4 the rigid annular supports 42 are shown as comprising a main support body 44, a pair of spaced mounting rings 45 and 47 connected to the inner face of main body portion 44, and a bladder supporting annulus 49 held between each pair of rings 45 and 47. The rings 45 and 47, in combination with the annulus 49 define annular support grooves 48 for mounting of the respective flanges 26 and 36 of each folded sleeve 10. Air used to inflate the bladders may conveniently be supplied through openings in the respective annuli 49, these openings being generally designated 52. It is understood that the details of the construction of the annular supports 42 as shown in FIG. 4 are exemplary only, and as such form no significant part of the present invention.

Thus, as seen in FIG. 4, the folded sleeve 10 forms an all rubber turn up bladder having an inner wall portion 30 immediately adjacent the periphery of support 42 and an outer wall portion 20, the length of which is definitive of the over-all length of the bladder. The inboard portion 54 of the outer bladder wall 20 may be provided with integral projections 55 for the purposes of gripping the plies during turn up. The cavity used to mold sleeve 10 can be designed to provide such projections 55. In order to fold the sleeve 10 to obtain a bladder of the form shown in FIG. 4, it is evident that the outer wall portion 20 be molded to embrace over one-half of the total axial length of the sleeve 10. In other words, the axial length of portion 30 is less than the axial length of portion 20 so that by folding portion 30 within portion 20 flanges 36 will locate just short of flanges 26. As further seen in FIG. 4, the thickened wall 29 of portion 20, after folding the sleeve 10, will locate at the outboard portion 56 of the bladder.

FIGS. 5 through 11 illustrate a typical turn up operation employing an all rubber bladder. The turn up operation is essentially the same as described in U.S. Pat. No. 3,171,769, mentioned previously. It should be understood that specific features of the sleeve 10 heretofore discussed are in connection with a preferred embodiment. For example, the provision that the outer bladder wall portion 20 be provided with a thickened wall 29 is for purposes of particularly desired expansion characteristics. If such characteristics are not desired, the cross-section of portion 20 need not vary as shown in FIGS. 1 through 4. In other words, outer bladder wall portion 20 may be of constant cross-section as generally shown in the operational sequence of FIGS. 5 through 11.

In each of these figures the turn up bladder is indicated generally as 10', the outer wall portion 20', the inner wall portion 30' and the annular fold portion 15', it being understood that the wall thickness of portion 20' may or may not be varied as discussed previously.

In FIG. 5, a carcass 2 has been placed on drum 50 and typical surface segments 5 of the drum 50 expanded to provide a bead ring receiving shoulder 7. Bead ring assembly 3 is held in an axially reciprocable ring 4, the inner diameter of which slightly exceeds that of the outer diameter of the bladder 10 when deflated. In FIG. 6 the ring 4 is shown moved axially inwardly to set bead ring assembly 3 against the carcass 2 at the shoulder 7. In FIG. 7 the ring 4 is returned to an "at rest" position and air is forced into bladder 10' as indicated by the arrows at B. It is further seen in FIG. 7 turn up of the ends of carcass 2 around bead assembly 3 has begun.

It is just prior to this step in the sequence (i.e. as shown in FIG. 7) that a variable wall thickness of portion 20' can be significant. Initial expansion will cause an axial shortening of bladder 10'. If the wall of outer portion 20' is made thicker near the outboard portion 56', it is less flexible than the wall section adjacent the inboard portion 54. Because of this difference in flexibility, the inboard wall section will move axially away from the drum 50 faster than the outboard portion of the bladder moves inwardly. This action results in a slightly delayed, axially outward pull on the carcass ends. Immediately upon entry of the air into bladder 10' the carcass 2 engages the radially innermost edge of the bead 3. Subsequently the axially outward pull of the carcass 2 tightly engages the carcass 2 with the axial inner edge of the beads 3. Further expansion then equalizes the inflated contour of the bladder 10' to that shown in FIG. 7. As expansion progresses the bladder 10' assumes a toroidal shape as shown in FIG. 8, whereby the inner bladder wall portion 30' is lifted from the periphery of support 42. At this point the bead 3 is surrounded by the carcass 2 substantially along three of its four edges. The annular ring 4, which is provided with a short annular projection 8, is once again moved axially inwardly and contacts the bladder 10' to force the same over onto the surface of the drum 50, as seen in FIG. 9. The annular ring 4 returns again to its rest position allowing the bladder 10' to deflate to a toroidal contour as seen in FIG. 10 and ultimately to an uninflated state as seen in FIG. 11. As further seen in FIG. 11 the carcass 2 has completely encased the annular bead 3 to complete the turn up operation.

As previously suggested several important advantages are associated with the use of all rubber bladders formed in accordance with the invention as hereinbefore described. There are no splices of any kind in the all rubber turn up bladder. It is not necessary to provide cords or other strengthening or stabilizing structures in the bladder. There is no necessity for using a variety of different rubber stocks, because the bladder consists wholly of a single rubber composition. Because of circumferential uniformity of wall thickness, annularly uniform inflation and deflation is realized. Therefore, possibilities of bulging usually caused by circumferentially non-uniform portions are non-existant. Because of the omission of cords and the structural uniformity of the bladder, a noted increase in cycle life is possible.

More pronounced increases in cycle life are realized when using all rubber turn up bladders according to the present invention on small, industrial-type tire building machines. Bladders made from sleeves of an all natural rubber compound according to the invention used with a 4 inch building drum have endured from between 20,000 to 40,000 turn up cycles, while similarly dimensioned cord reinforced bladders made in accordance with the prior art have failed as early as 20 cycles. In this small size the best cycle life for most cord reinforced bladders is around 5,000 cycles.

It should be understood that the foregoing specification relates only to preferred embodiments of the invention and that certain obvious modifications and alterations may be made without departing from the spirit and scope of the invention measured by the appended claims.

What is claimed is:

1. An all rubber sleeve formed about a longitudinal axis for use as an inflatable turn up bladder for a tire-building machine and having a substantially uniform cross-sectional thickness along any one plane through said sleeve normal to said longitudinal axis, said sleeve comprising
   (A) an outer bladder wall portion of major outside diameter, defining over one-half the axial length of said sleeve and
   (B) an inner bladder wall portion of minor outside diameter,
   (C) an annular fold juncture portion extending integrally between said bladder wall portions, and
   (D) a flange-like ring portion at each end of said sleeve, each of said ring portions having a greater cross-sectional thickness, in relation to all other portions of said sleeve,
   wherein said sleeve is molded symmetrically about said longitudinal axis such that the outer surface of said outer bladder wall portion tapers toward said fold juncture and the outer surface of said inner bladder wall portion tapers away from said fold juncture.

2. A rubber sleeve as defined in claim 1 wherein the cross-sectional thickness of said outer bladder wall varies in an axial direction such that a selected axial section adjacent said juncture is thicker than the remaining axial section thereof.

3. The sleeve as defined in claim 2 wherein the cross-sectional thickness of said inner wall portion is substantially constant throughout its axial length.

4. In a ply turnup mechanism for a tire building machine said mechanism comprising a rigid annular support member and an inflatable annular bladder member mounted thereon, the improvement wherein said bladder member consists of an all rubber sleeve molded symmetrically about its longitudinal axis, said sleeve comprising
   (A) an outer bladder wall portion of major outside diameter defining over one-half the axial length of said sleeve,
   (B) an inner bladder wall portion of minor outside diameter,
   (C) an annular fold juncture extending integrally between said bladder wall portions, and
   (D) a flange-like ring portion at each end of said sleeve, each of said ring portions having a greater cross-sectional thickness in relation to all other portions of said sleeve, and
   wherein the outer surface of said outer bladder wall portion tapers toward said fold juncture and the outer surface of said inner bladder wall portion tapers away from said fold juncture, said sleeve being folded along said annular fold juncture portion thereof such that said inner wall portion fits within said outer wall portion.

5. The mechanism as defined in claim 4 wherein the cross-sectional thickness of said outer bladder wall varies in an axial direction such that a selected axial section adjacent said juncture is thicker than the remaining axial section thereof.

6. The mechanism as defined in claim 4 wherein the cross-sectional thickness of said inner wall portion is substantially constant throughout its axial length.

7. The mechanism as defined in claim 5 wherein cross-sectional thickness of said inner wall portion is substantially constant throughout its axial length.

References Cited

UNITED STATES PATENTS

| | | | |
|---|---|---|---|
| 3,053,308 | 9/1962 | Vanzo et al. | 156—132 |
| 3,265,549 | 8/1966 | Woodhall et al. | 156—401 |
| 2,653,645 | 9/1953 | Frazier | 156—401 |

STEPHEN C. BENTLEY, Primary Examiner